(12) United States Patent
Lee et al.

(10) Patent No.: US 8,718,191 B2
(45) Date of Patent: May 6, 2014

(54) METHOD AND APPARATUS FOR TRANSMITTING/RECEIVING DATA IN WIRELESS COMMUNICATION SYSTEM

(75) Inventors: Il-Gu Lee, Seoul (KR); In-Kyeong Choi, Daejeon (KR); Yu-Ro Lee, Daejeon (KR); Jong-Ee Oh, Daejeon (KR); Eun-Young Choi, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 180 days.

(21) Appl. No.: 13/033,202

(22) Filed: Feb. 23, 2011

(65) Prior Publication Data

US 2011/0206156 A1    Aug. 25, 2011

(30) Foreign Application Priority Data

Feb. 23, 2010 (KR) .................... 10-2010-0015985
Mar. 12, 2010 (KR) .................... 10-2010-0022280
Mar. 26, 2010 (KR) .................... 10-2010-0027476
Apr. 21, 2010 (KR) .................... 10-2010-0037022
May 11, 2010 (KR) .................... 10-2010-0043894
May 20, 2010 (KR) .................... 10-2010-0047245

(51) Int. Cl.
*H04L 27/20* (2006.01)

(52) U.S. Cl.
USPC ........... 375/308; 329/304; 332/103; 375/279; 375/283; 375/329

(58) Field of Classification Search
None
See application file for complete search history.

(56) References Cited

U.S. PATENT DOCUMENTS

| 7,474,608 B2 | 1/2009 | Stephens et al. | |
| 2009/0238290 A1* | 9/2009 | Imai et al. | 375/260 |
| 2012/0093025 A1* | 4/2012 | Pare et al. | 370/253 |

OTHER PUBLICATIONS

Hemanth Sampath et al., "802.11ac Preamble", IEEE 802.11-10/876r1, Jul. 13, 2010, pp. 1-18.
Il-Gu Lee et al., "802.1lac Preamble for VHT Auto-Detection", IEEE 802.11-1010628r1, May 20, 2010, pp. 1-24.
Il-Gu Lee et al., "802.1lac Preamble for VHT Auto-Detection", IEEE 802.11-10/0359r0, Mar. 16, 2010, pp. 1-10.

* cited by examiner

*Primary Examiner* — Adolf Dsouza

(57) ABSTRACT

A method for transmitting, by a transmitting terminal, data to a receiving terminal in a wireless communication system includes: generating a first detection field including symbols modulated by using a BPSK data tone; generating a second detection field including symbols modulated such that an even numbered subcarrier and an odd numbered subcarrier have a phase difference of 90 degrees; generating a data packet including the first detection field, the second detection field, and the data; and transmitting the data packet.

5 Claims, 17 Drawing Sheets (a) VHT-SIG1        (b) VHT-SIG2

(a) VHT-SIG1                (b) VHT-SIG2

(a) VHT-SIG1   (b) VHT-SIG2

(a) L-SIG(BPSK)   (b) VHT-SIG1 (BPSK)   (c) VHT-SIG2 (45/-45 degree phase rotated BPSK)

(a) L-SIG(BPSK)   (b) VHT-SIG1 (BPSK)   (c) VHT-SIG2 (0/-90 degree phase rotated BPSK)

(a) L-SIG(BPSK) (BPSK data and normal pilot)   (b) VHT-SIG1 (BPSK data and normal pilot)   (c) VHT-SIG2 (0/-90 degree phase rotated BPSK data and 90 degree phase rotated pilot)

(a) L-SIG(BPSK)
(BPSK data and normal pilot)

(b) VHT-SIG1
(BPSK data and BPSK pilot)

(c) VHT-SIG2
(Q-BPSK data and Q-BPSK pilot)

000# METHOD AND APPARATUS FOR TRANSMITTING/RECEIVING DATA IN WIRELESS COMMUNICATION SYSTEM

CROSS-REFERENCE(S) TO RELATED APPLICATIONS

The present application claims priority of Korean Patent Application Nos. 10-2010-0015985, 10-2010-0022280, 10-2010-0027476, 10-2010-0037022, 10-2010-0043894 and 10-2010-0047245, filed on Feb. 23, 2010, Mar. 12, 2010, Mar. 26, 2010, Apr. 21, 2010, May 11, 2010 and May 20, 2010, respectively, which are incorporated herein by reference in their entirety.

BACKGROUND OF THE INVENTION

1. Field of the Invention

Exemplary embodiments of the present invention relate to a method and apparatus for transmitting/receiving data in a wireless communication system.

2. Description of Related Art

Wireless communication systems have been developed to transmit large amounts of data at higher speed. As for types of wireless communication systems, there are Wibro wireless communication systems, 3GPP Long Term Evolution (LTE) systems, Very High Throughput (VHT) Wireless Local Area Network (WLAN) systems, and the like.

Currently, the standardization of VHT systems is in progress by the IEEE 802.11ac task group, aiming at satisfying speed conditions of 1 Gbps for a single user and 500 Mbps for two or more users each. Such VHT systems need to have compatibility with existing systems while satisfying the above conditions. Thus, in order to meet all the conditions above, a new frame format is required in a new VHT system conforming to the IEEE 802.11ac standard.

SUMMARY OF THE INVENTION

An embodiment of the present invention is directed to a new frame format used in a wireless communication system supporting high-speed data transmission/reception.

Another embodiment of the present invention is directed to a method and apparatus for transmitting/receiving data capable of supporting specifications of wireless communication system conforming to a new standard, while providing compatibility with existing wireless communication systems.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for transmitting, by a transmitting terminal, data to a receiving terminal in a wireless communication system includes: generating a first detection field including symbols modulated by using a BPSK data tone; generating a second detection field including symbols modulated such that an even numbered subcarrier and an odd numbered subcarrier have a phase difference of 90 degrees; generating a data packet including the first detection field, the second detection field, and the data; and transmitting the data packet.

In accordance with another embodiment of the present invention, an apparatus includes a method for receiving, by a receiving terminal, a data packet transmitted by a transmitting terminal in a wireless communication system, includes: receiving the data packet including a first detection field, a second detection field, and a legacy signal field; and discriminating a format of the data packet by using the first detection field, the second detection field, and the legacy signal field.

DESCRIPTION OF SPECIFIC EMBODIMENTS

Figure 1:
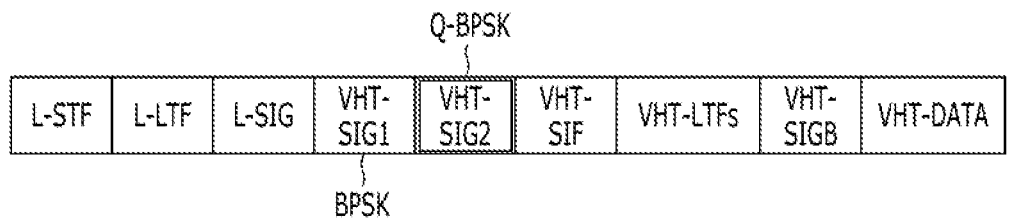
FIG. 1 illustrates an example of a conventional IEEE 802.11ac frame structure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates one example of a conventional IEEE 802.11ac frame structure.

Referring to FIG. 1, in the conventional frame structure, a VHT-SIG1 field and a VHT-SIG2 field are defined for frame identification by a common client, and a VHT-SIGB field is defined for frame identification by a MU-MIMO dedicated client. Furthermore, in the frame structure depicted in FIG. 1, the VHT-SIG1 and VHT-SIG2 fields are used without an HT-SIG field, and the VHT-SIG1, which is the first symbol, and the VHT-SIG2, which is the second symbol, are respectively modulated by using binary phase shift keying (BPSK) and quadrature BPSK (Q-BPSK) (see FIGS. 2A and 2B).

An IEEE 802.11a/n device receiving packets having the structure as shown in FIG. 1 recognizes a corresponding packet as a legacy mode through the VHT-SIG1 field, and performs L-SIG spoofing. Meanwhile, an IEEE 802.11ac device recognizes a corresponding packet as a VHT mode by the second symbol of the VHT-SIG2 field.

However, when a data frame having the structure shown in FIG. 1 is used, an error may occur in the 11n device based on the 802.11n standard. This is because two symbols of an HT-SIG field are both defined through Q-BPSK in the existing 802.11n standard, and the 11n device performs an auto-detection using both the two symbols of the HT-SIG field. Furthermore, the IEEE 802.11n device, which partially uses only the second symbol of the HT-SIG field, may also undergo performance degradation. That is, the data frame having the structure as shown in FIG. 1 is unfair and risky for the existing 11n device.

Figure 3:
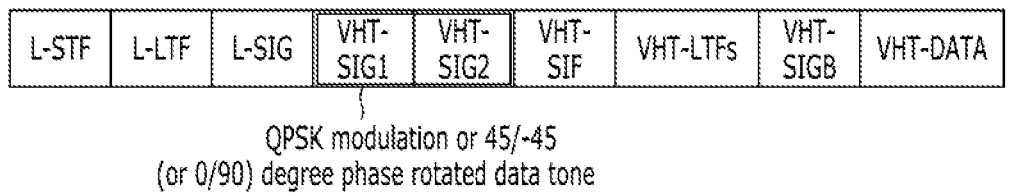
FIG. 3 illustrates another example of the conventional IEEE 802.11ac frame structure.

FIG. 3 illustrates another example of the conventional IEEE 802.11ac frame structure.

Figure 4:
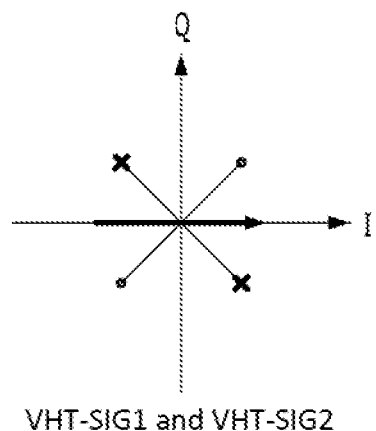
FIG. 4 is a constellation diagram of VHT-SIG1 and VHT-SIG2 fields.

The frame structure shown in FIG. 3 may be generated by any one of the following two methods: the first method involves alternately modulating even numbered carriers and odd-numbered carriers with the two symbols of VHT-SIG1 and VHT-SIG2 by using Q-BPSK and BPSK, and the second method involves alternately rotating a 45/−45 degree phase even numbered carriers and odd numbered carriers with the two symbols of VHT-SIG1 and VHT-SIG2, and transmitting the same (see FIG. 4).

Of the above two methods, the first method may cause performance degradation since the number of comparative samples is reduced by half. The second method may also bring about performance degradation since a detection threshold is reduced by half. For this reason, when a data frame having the structure as shown in FIG. 3 is used, a specific 11n device may not operate. Thus, the data frame is unfair and risky for the 11n device.

The existing frame structures and data transmission methods using the same, described above with reference to FIGS. 1 to 4, are to discriminate all of 802.11a, 802.11n, and 802.11ac devices while using a VHT-SIG field in the position of an HT-SIG field of the conventional 802.11n mixed mode frame. This, however, is effective only when the 802.11n device adopts a specific auto-detection scheme. That is, the frame structure and transmission using the same depicted in FIGS. 1 and 2 fail to meet the 802.11n standard defining Q-BPSK in two symbols of an HT-SIG field. Also, the frame structure and transmission using the same, depicted in FIGS. 3 and 4, is unavailable for various HT auto-detection methods that can be used in the 802.11n device because of the phase modulation performed upon all the symbols.

Figure 2:
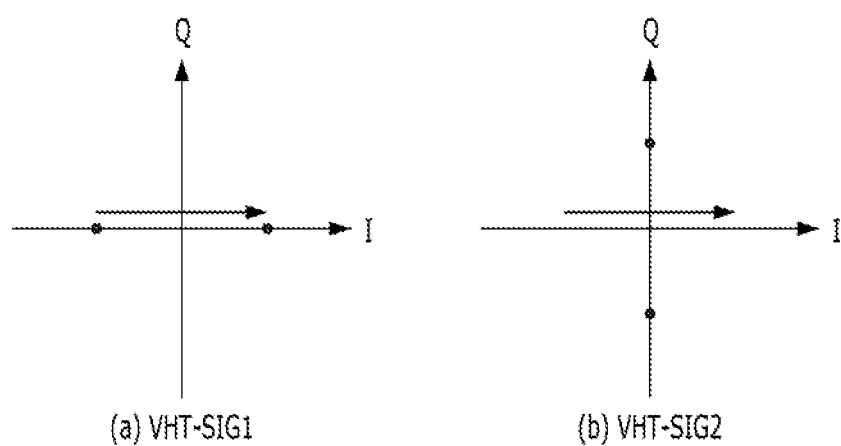
FIGS. 2A and 2B are constellation diagrams of VHT-SIG1 and VHT-SIG2 fields.

Namely, in the related art, the IEEE 802.11n device, utilizing HT-SIG2 for an auto-detection, may cause errors (see FIGS. 1 and 2). Furthermore, a detection threshold is reduced by half in the process of auto-detection, thus impairing performance, and an IEEE 802.11n device using a specific auto-detection algorithm may cause errors (see FIGS. 3 and 4).

To overcome the aforementioned limitations of the related art, exemplary embodiments of the present invention provide a new frame structure, capable of achieving both superior performance and compatibility in auto-detection after data transmission, and an auto-detection method using the same. That is, the new frame structure and the auto-detection using the same need to be fair to both the IEEE 802.11a/n and IEEE 802.11ac devices, conform to the IEEE 802.11n standard, and have a high level of performance.

Figure 5:
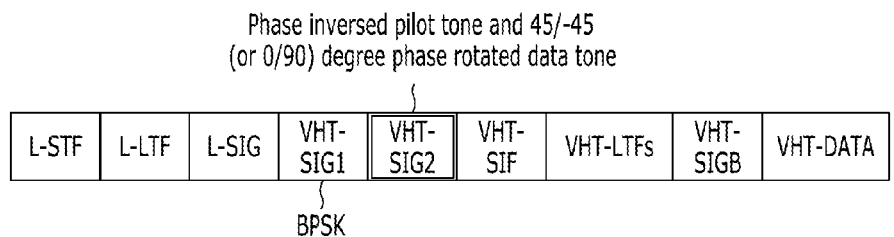
FIG. 5 illustrates a frame structure in accordance with a first embodiment of the present invention.

FIG. 5 illustrates a frame structure in accordance with a first embodiment of the present invention.

Referring to FIG. 5, a VHT-SIG1 field of a frame in accordance with the first embodiment of the present invention is modulated through BPSK, and a VHT-SIG2 field thereof is modulated by using a phase-inversed pilot tone and a 45/−45 degree (or 45/135 degree) phase rotated data tone. FIGS. 6A and 6B are constellation diagrams illustrating the VHT-SIG1 field and the VHT-SIG2 field, respectively.

When a data frame having the structure as shown in FIG. 5 is received, each device operates in the following manner. First, an IEEE 802.11a device recognizes a received packet as a legacy mode, and performs L-SIG spoofing. Meanwhile, an IEEE 802.11n device recognizes a legacy mode through a VHT-SIG1 field of a received packet, and performs L-SIG spoofing. Furthermore, since the VHT-SIG1 is a BPSK modulated symbol, and the VHT-SIG2 is a 45/−45 degree phase rotated BPSK symbol, the energy of the I axis is greater than Q-axial energy in the mean of the two VHT-SIG symbols. Thus, the IEEE 802.11n device using up to two symbols for an auto-detection recognizes a received packet as a legacy mode and performs L-SIG spoofing.

In accordance with the first embodiment of the present invention as described above, the IEEE 802.11n device using both the two symbols to automatically detect a packet type can solve the limitation of auto-detection failure caused when a packet is received by the method depicted in FIGS. 1 and 2.

Also, in accordance with the first embodiment of the present invention, an IEEE 802.11ac device may automatically detect a VHT mode by detecting a 180 degree phase inversed pilot tone and a 45 degree phase rotated data tone in the VGT-SIG2 field.

Accordingly, the data frame structure and the data transmission/reception method in accordance with the embodiment of the present invention is fair to both the IEEE 802.11a/n device and the IEEE 802.11ac device. Furthermore, by using the pilot tone having a phase difference of 180 degrees, as well as 45/−45 degree phase rotated data tone, the auto-detection performance of the IEEE 802.11ac device is enhanced. Since four pilot tones and six pilot tones are disposed in a 20 MHz bandwidth and a 40 MHz bandwidth, respectively, the phase difference can be compensated for by calculating the phase of a pilot before the beginning of each symbol. When a phase inversed pilot, disposed in the VHT-SIG2 field for a packet auto-detection is used, the features of a phase difference of 180 degrees, namely, the Euclidean distance, are maximized, thus enabling accurate packet detection. Consequently, in accordance with the embodiment of the present invention, the performance of a packet auto-detection is improved by using a phase difference of 45 degrees in the data tone and a phase difference of 180 degrees in the pilot tone at the same time.

Figure 6:
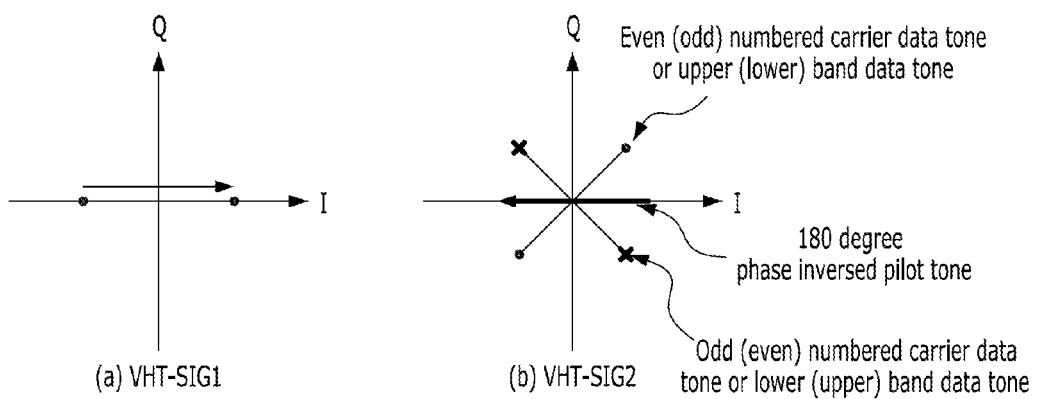
FIGS. 6A and 6B are constellation diagrams of VHT-SIG1 and VHT-SIG2 fields.
Figure 7:
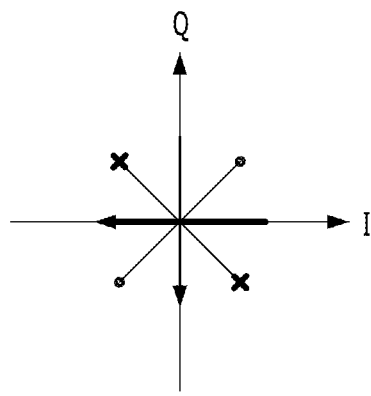
FIG. 7 is a constellation diagram for explaining another usage example of a data tone and a pilot tone depicted in FIG. 6.

FIG. 7 is a constellation diagram for explaining another usage example of the data tone and the pilot tone depicted in FIG. 6.

In FIG. 6B, if a mark indicated by ● denotes an even numbered data tone, a mark indicated by x denotes an odd numbered data tone. In contrast, if the mark indicated by ● denotes an odd numbered data tone, the mark indicated by x denotes an even numbered data tone. Furthermore, a horizontal arrow denotes a pilot, and the right direction thereof indicates 0 degree while the left direction indicates 180 degrees. In FIG. 6A, a mark indicated by ● is used to express the entirety of a single symbol, regardless of a carrier or a band.

Meanwhile, in FIG. 7, if a mark indicated by ● denotes a data tone of a lower band, a mark indicated by x denotes a data tone of an upper band. In contrast, if the mark indicated by ● denotes a data tone of an upper band, the mark indicated by x denotes a data tone of a lower band. Furthermore, if a horizontal arrow denotes a pilot of a lower band, a vertical arrow denotes a pilot of an upper band. In contrast, if the horizontal arrow denotes a pilot of an upper band, the vertical arrow denotes a pilot of a lower band.

For example, although the embodiment shown in FIGS. 5 and 6 is described on the assumption of a 20 MHz single-band, if the band is expanded, the constellation diagram as shown in FIG. 7 may be used in accordance with the concept of upper and lower bands. Here, the upper band means a frequency band higher than a center frequency, while the lower band means a frequency band lower than the center frequency. That is, the mark indicated by ● denotes the data tone of a lower band of even numbered/odd numbered tones, the mark indicated by x denotes a data tone of an upper band of odd/even numbered tones, the horizontal arrow denotes a pilot of the lower band, and the vertical arrow denotes a pilot of the upper band.

In the constellation diagrams of FIGS. 6A, 6B and 7, a 180 degree phase rotated pilot tone may be used, as well as a 45/−45 or 0/90 degree phase rotated data tone.

Figure 8:
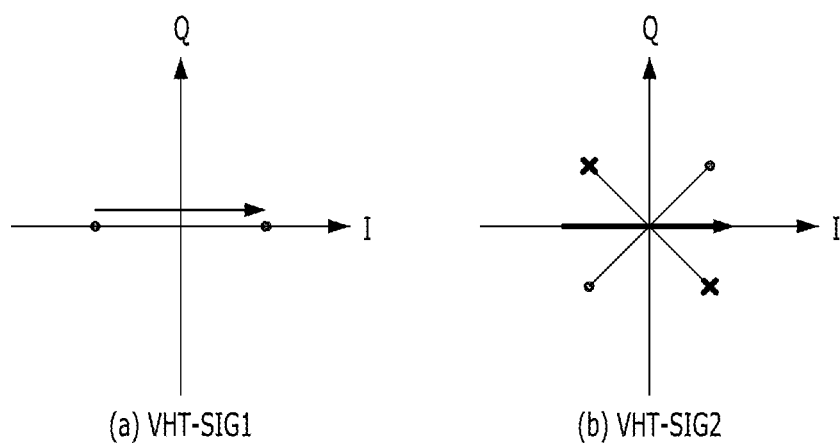
FIGS. 8A and 8B are constellation diagrams for explaining a second embodiment of the present invention.

FIG. 8 is a constellation diagram for explaining a second embodiment of the present invention.

In FIGS. 8A and 8B, as for the first symbol, a data tone is modulated through BPSK, and there is no phase rotation of a pilot. As for the second symbol, a data tone is modulated through 45/−45 degree phase rotated BPSK, and there is no phase rotation of a pilot tone.

Figure 9:
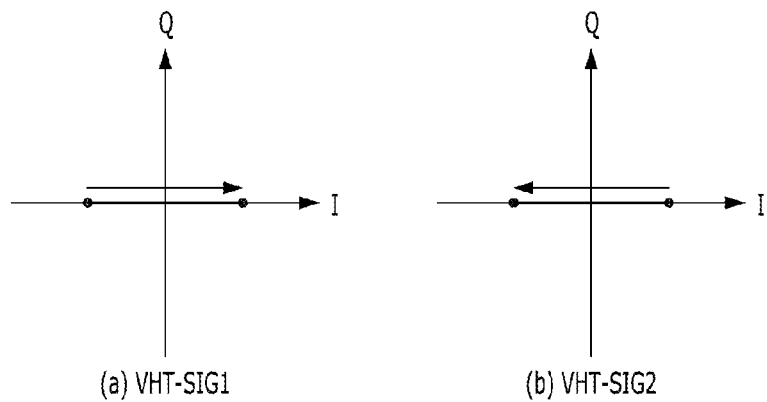
FIGS. 9A and 9B are constellation diagrams for explaining a third embodiment of the present invention.
Figure 10:
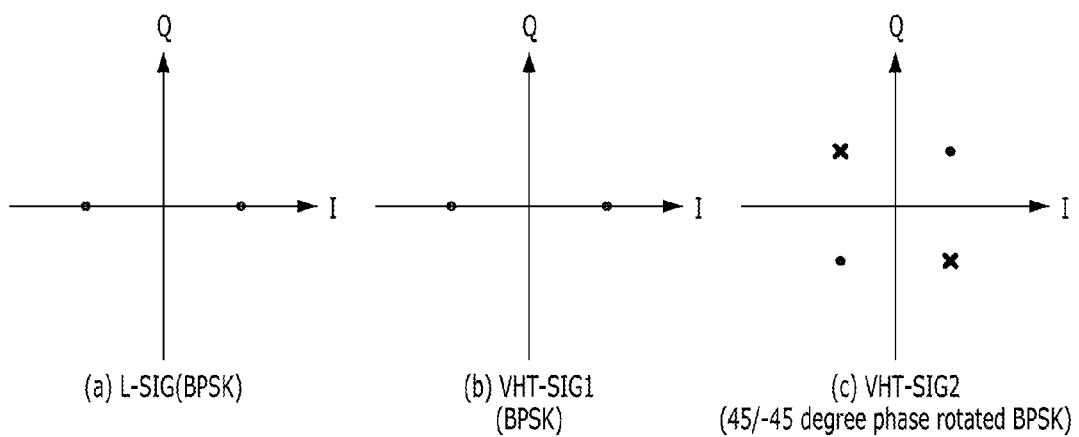
FIGS. 10A to 10C are constellation diagrams for explaining a ninth embodiment of the present invention.

FIGS. 9A and B are constellation diagrams for explaining a third embodiment of the present invention.

In FIGS. 9A and 9B, as for both the two symbols, data tones are modulated using BPSK, a pilot of the first symbol is transmitted without being phase rotated, and a pilot of the second symbol is inversed by 180 degrees and transmitted.

Hereinafter, fourth to ninth embodiments of the present invention will be described.

<Fourth Embodiment>
VHT-SIG1: BPSK data tone and phase inversed pilot tone
VHT-SIG2: BPSK data tone and phase inversed pilot tone <Fifth Embodiment>
VHT-SIG1: BPSK data tone and phase inversed pilot tone
VHT-SIG2: 45/−45 degree phase rotated data tone and phase inversed pilot tone <Sixth Embodiment>
VHT-SIG1: 45/−45 degree phase rotated data tone and phase rotated pilot tone
VHT-SIG2: 45/−45 degree phase rotated data tone and phase inversed pilot tone In accordance with the fourth and fifth embodiments, a specific terminal which performs tracking with an inversed pilot tone in the VHT-SIG1 may have characteristic differences according to a loop filter. Also, the sixth embodiment improves auto-detection performance of the IEEE 802.11ac device, but is unfair to the IEEE 802.11n device.

<Seventh Embodiment>
VHT-SIG1: BPSK data tone
VHT-SIG2: 45/−45 degree phase rotated data tone <Eighth embodiment>
VHT-SIG1: BPSK data tone
VHT-SIG2: 0/90 degree phase rotated data tone <Ninth Embodiment>
VHT-SIG1: BPSK data tone and pilot tone without phase rotation
VHT-SIG2: 0/90 degree phase rotated data tone and 90 degree phase rotated pilot tone In accordance with the seventh embodiment, the 802.11a device and the 802.11n device determine a corresponding frame as a legacy frame according to the BPSK modulated data tone of a VHT-SIG1, and perform L-SIG spoofing. Since the mean of I-axial (In-phase) energy distribution of all the carriers in the VHT-SIG1 and uncertain 45 degree energy distribution is inclined more to the I-axis, even the 802.11n performing an HT auto-detection using both the two symbols of an HT-SIG can perform the HT auto-detection. Furthermore, the 802.11ac device performs VHT auto-detection by using a VHT-SIG2 having 45/−45 phase shift.

In accordance with the eighth embodiment, the VHT-SIG1 is modulated through BPSK, and the data tone of the VHT-SIG2 is rotated 0/90 degree phase and transmitted. Accordingly, the 802.11a and 802.11n devices determine a corresponding frame as a legacy frame by using the BPSK modulated VHT-SIG1, and perform L-SIG spoofing. While all the carriers of the VHT-SIG1 are distributed on the I-axis, only carriers corresponding to a half of one symbol of the VHT-SIG2 is distributed on the I-axis and the rest is distributed on the Q-axis. Thus, I-axial energy is greater on the average. Furthermore, the 802.11ac device detects a 90 degree phase rotation of the VHT-SIGA2 to thus perform a VHT auto-detection.

Figure 11:
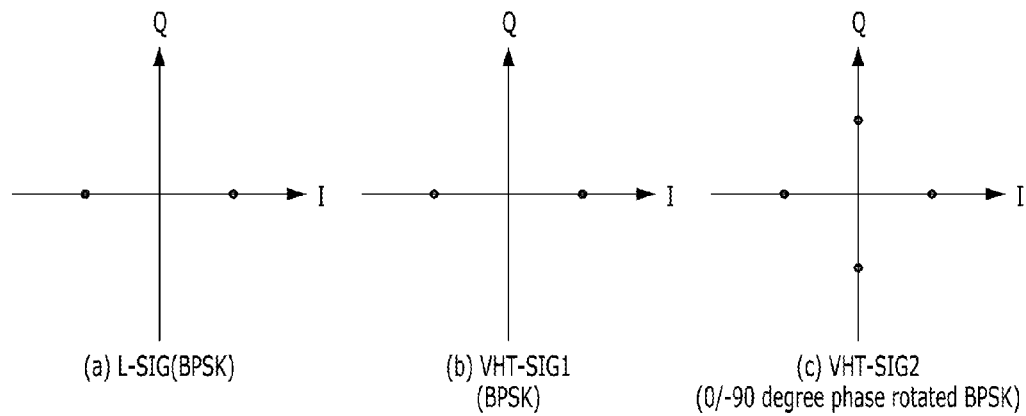
FIGS. 11A to 11C are constellation diagrams for explaining the ninth embodiment of the present invention.
Figure 12:
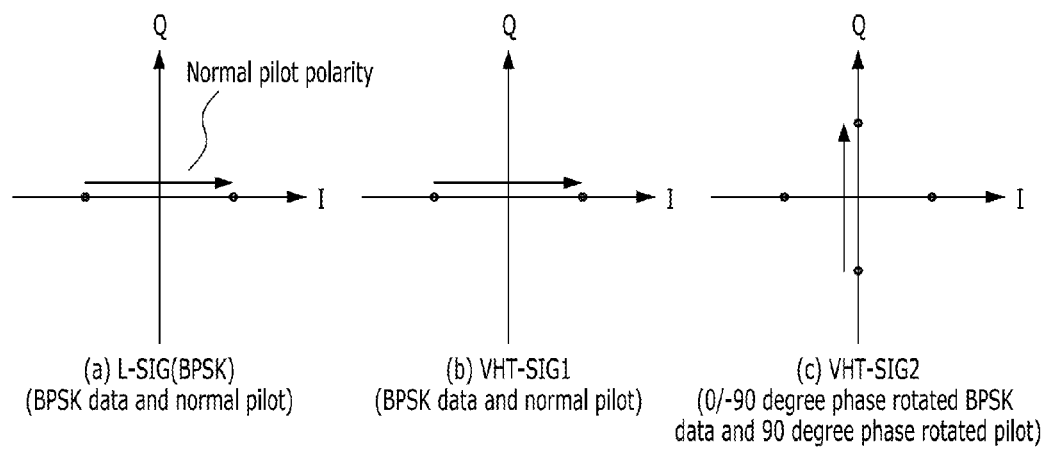
FIGS. 12A to 12C are constellation diagrams for explaining the ninth embodiment of the present invention.

In accordance with the ninth embodiment, when fields shown in FIGS. 10A to 11C are used, the VHT auto-detection performance of the 802.11ac device can be improved. Since a 45/−45 phase difference needs to be detected in the case of FIG. 10, a comparative threshold is reduced by 50% as compared to the case of 90 degrees. In the case of FIG. 11, a comparative threshold of 90 degrees is usable. However, since a 0/90 degree phase rotation method is used, carriers mapped to 0 degree cannot be a comparative object, and thus the number of comparable carriers is reduced by half. Accordingly, since a 90 degree phase rotated pilot is used in order to improve the VHT auto-detection performance of the 802.11ac device, four more tones can be used in a 20 MHz bandwidth mode, and reliability can be enhanced by 15%.

The energy of a Q-phase is reinforced by the 90-degree phase rotation of a pilot, thus enhancing VHT auto-detection performance. Since the 90 degree phase rotated pilot is not used in the HT auto-detection, the performance of the 802.11n device can be maintained. Also, the 802.11n device, when receiving a frame transmitted as in the ninth embodiment, can compensate for the phase difference of 90 degrees by estimating it with the pilot. Since the data tone is rotated 0/90 degree phase, the energy distribution of an I-phase and the energy distribution of a Q-phase are equal to each other regardless of rotation. That is, even after the phase difference of the pilot is compensated for, the energy distribution of the VHT-SIG2 is distributed in half for each of I and Q. Thus, when all the carriers are averaged with the VHT-SIG1 on the I-axis, the energy of the I axis is detected as a higher level.

<Tenth Embodiment>
VHT-SIG1: BPSK data tone and pilot tone without phase rotation
VHT-SIG2: 45/−45 degree phase rotated data tone, and 45/−45 degree phase rotated pilot tone The tenth embodiment operates by the same principle as the ninth embodiment. In the tenth embodiment, a data tone has a phase difference of 45 degrees, rather than 90 degrees, and a pilot tone also has a phase difference of 45 degrees. In such a manner, the number of tons having the phase difference increases. Consequently, the auto-detection performance of the 802.11ac can be improved.

Figure 13:
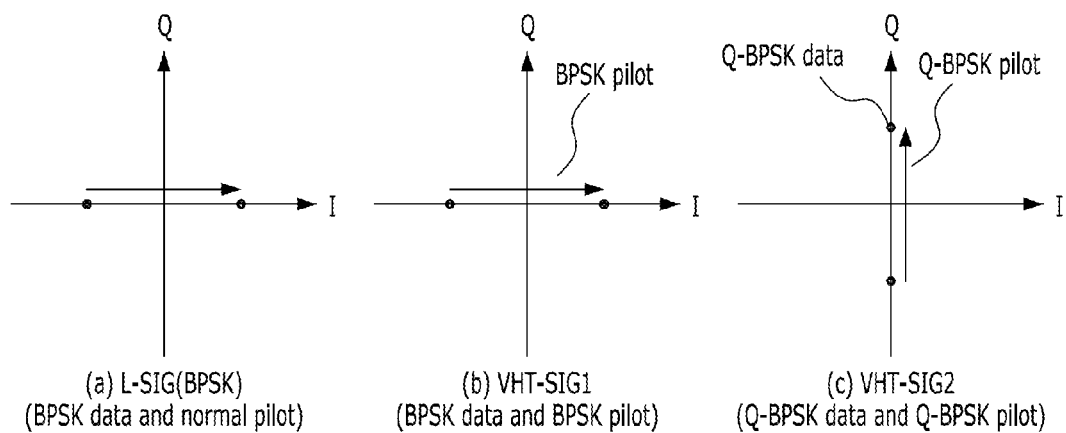
FIGS. 13A to 13C are constellation diagrams for explaining an eleventh embodiment of the present invention.

<Eleventh Embodiment>
VHT-SIG1: BPSK data tone and pilot tone without phase rotation
VHT-SIG2: Entire data carriers are rotated 90-degree phase and pilot tone is also rotated 90-degree phase Compared with the ninth embodiment in which only the carriers corresponding to a half of the carriers of the second VHT-SIG symbol are used in the VHT automatic detection, in the eleventh embodiment, as shown in FIGS. 13A and 13B, all the data carriers of the second VHT-SIG symbol are modulated according to 90-degree rotated Q-BPSK and the pilot is also rotated 90 degree phase and transmitted, thus improving the reliability of the VHT automatic detection.

Figure 14:
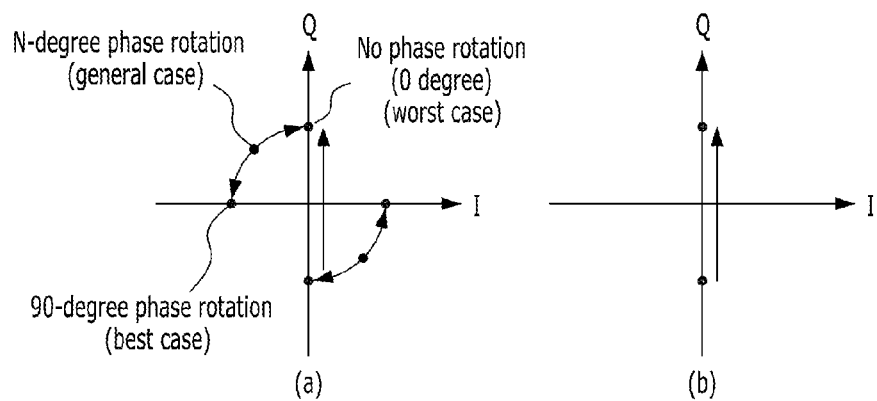
FIGS. 14A and 14B are constellation diagrams for explaining HT auto-detection of an 11n device.

FIGS. 14A and 14B are constellation diagrams for explaining HT auto-detection of the 11n device. The 802.11n standard defines a pilot tone in an HT signal field to allow a reception end of the 11 n device to correct a phase error by using a pilot tone. Thus, the general 11n reception end detects a change in the phase by 90 degrees of the second symbol, recognizes the 90-degree phase change as an error, and corrects it. In order to correct the phase error, a loop filter is generally used. When the phase recognized as the phase error is 90 degrees, the phase is compensated for with N degrees (0 degrees≤N≤90 degrees).

FIG. 14A shows a movement applied to the second symbol of the VHT-SIG field when the 11n reception end receives a VHT packet in accordance with the eleventh embodiment. In FIG. 14A, although the data carriers have the Q-BPSK form, when the VHT packet is received by the reception end, the data carriers are received in the form which has been rotated by N degrees from the Q axis, having the effect that energy is distributed to the I and Q axes. As a result, the energy of the I axis increases due to the energy of the I axis according to the BPSK modulation of the first VHT-SIG, reducing the probability in which the transmitted VHT packet is misrecognized as an HT packet.

FIG. 14B is a constellation diagram for explaining an operation when the 11ac device receives the VHT packet in accordance with the eleventh embodiment. The 11ac device already knows about the 90-degree phase rotation of the pilot, so it receives the data tone with the phase as it is through Q-BPSK and also uses the 90-degree phase rotated pilot tone together to thus allow for a reliable VHT automatic detection.

As a result, the use of the VHT packet in accordance with the eleventh embodiment can lead to a reduction in an error probability of the HT automatic detection of the 11n device and enhancement of the reliability of the VHT automatic detection.

Hereinafter, a method for discriminating, by a receiving terminal, the format of a packet having the frame structure in accordance with an exemplary embodiment of the present invention when the receiving terminal receives the packet, namely, an automatic detection, will be described.

Figure 15:
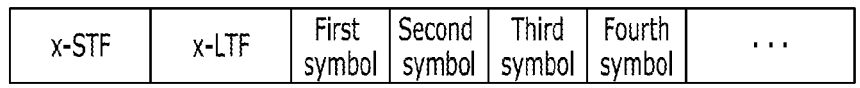
FIG. 15 is a general packet model.

FIG. 15 shows a general packet model. In the case of a legacy format or an HT mixed mode format, the first, second, and third symbols in FIG. 15 are a legacy signal field, an HT signal field 1, and an HT signal field 2 in order. In the case of an HT green field mode format, the first and second symbols are the HT signal field 1 and the HT signal field 2 in order. In the case of a VHT mixed mode format, the first, second, and third symbols are a legacy signal field, a VHT signal field 1, and a VHT signal field 2. In the case of a VHT green field mode format, the first and second symbols are the VHT signal field 1 and the VHT signal field 2, respectively.

Figure 16:
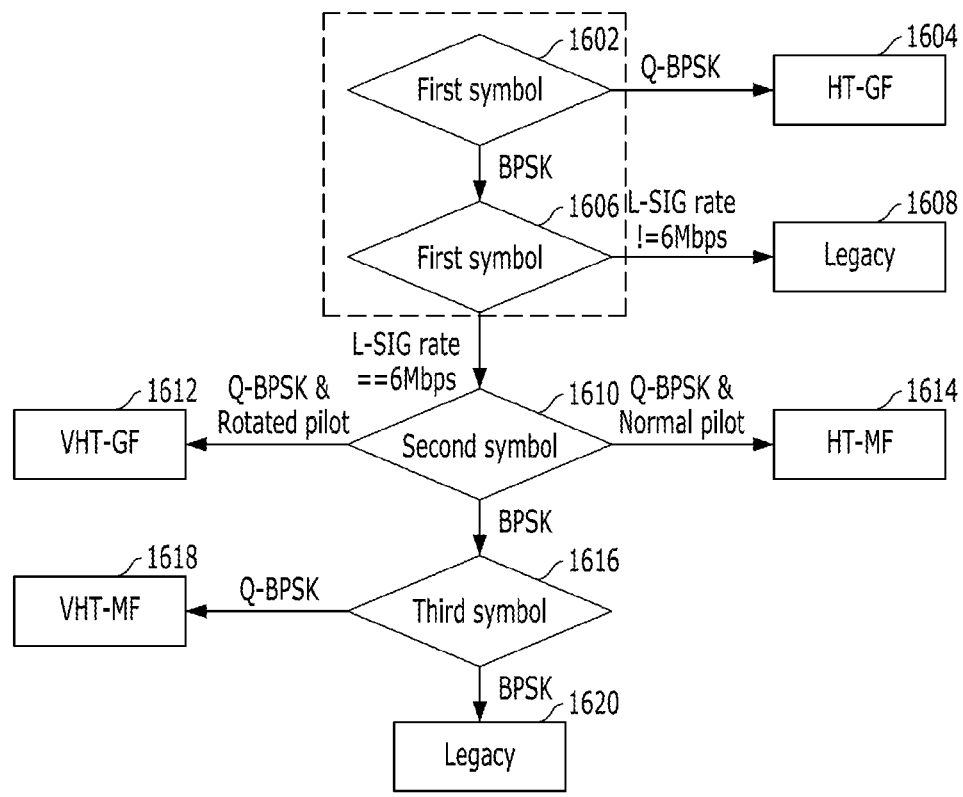
FIG. 16 is a flowchart illustrating the process of discriminating, by a receiving terminal, a format of a packet upon receiving the packet.

Since the fields are different according to the formats of packets, the receiving terminal, which receives a transmitted packet, discriminates the format of the received packet by using the respective fields. FIG. 16 is a flowchart illustrating the process of discriminating, by the receiving terminal, the format of a packet upon receiving it.

First, the receiving terminal discriminates whether a first symbol has been modulated through Q-BPSK or BPSK at step S1602. When the first symbol has been modulated through Q-BPSK, the format of a corresponding packet is determined as the HT green field mode (HT-GF) at step S1604. Then, the receiving terminal checks whether or not an L-SIG rate of the first symbol is 6 Mbps at step S1606. When the L-SIG rate is not 6 Mbps, the format of the packet is determined to be legacy at step S1608.

Next, the receiving terminal discriminates whether a second symbol has been modulated through BPSK or Q-BPSK at step S1610. When the second symbol has been modulated through Q-BPSK and has an inversed pilot, a corresponding packet is determined to have the VHT green field (VHT-GF) mode at a step S1612. When the second symbol has been modulated through Q-BPSK and has normal pilot, a corresponding packet is determined to have an HT mixed mode (HT-MF) at step S1614.

When a third symbol has been modulated through Q-BPSK at step S1616, a corresponding packet is determined as the VHT mixed mode (VHT-MF) at step S1618, and when the third symbol has been modulated through BPSK, the packet is determined as a legacy mode at step S1620. The flowchart of FIG. 16 shows that when the VHT-SIG1 is modulated through BPSK and the VHT-SIG2 includes a phase-inversed pilot, the VHT green field mode can be detected from the second symbol. Besides, when a 90-degree phase rotated pilot is used or when a data tone transmitted with a different phase at every even numbered/odd numbered subcarrier is used, the 90-degree phase rotated pilot can be detected to detect the VHT green field mode. Also, when a data tone using a different phase for every even numbered/odd numbered subcarrier is used, the phase of each of the even numbered or odd numbered subcarriers is reversely rotated to make the even numbered and odd numbered subcarriers have the same phase, and in this state, energy is detected to thus quickly detect the VHT green field mode.

Hereinafter, a method for improving the performance of the scheme in which the even numbered/odd numbered carriers of the VHT signal field are transmitted by changing their phase by using transfer rate information (L-RATE) and transport packet length information (L-Length) of the legacy signal field will be described. The method to be described hereinafter is an embodiment of improving a packet transmission performance by using the L-RATE and the L-Length and the present invention is not limited to the improvement of the performance of the scheme in which the even numbered/odd numbered carriers are transmitted by changing their phase. For example, the method to be described hereinafter can be also applicable to a case in which every carrier is transmitted through Q-BPSK.

First, a modulation scheme of a first symbol is checked at step S1702. When the first symbol has been modulated through Q-BPSK, a corresponding packet is determined as the HT green field mode (HT-GF) at step S1704. When the first symbol has been modulated through BPSK at step S1706, if the L-DATA RATE is not 6 or 9 Mbps, the format of the packet is determined to be legacy at step S1708.

Figure 17:
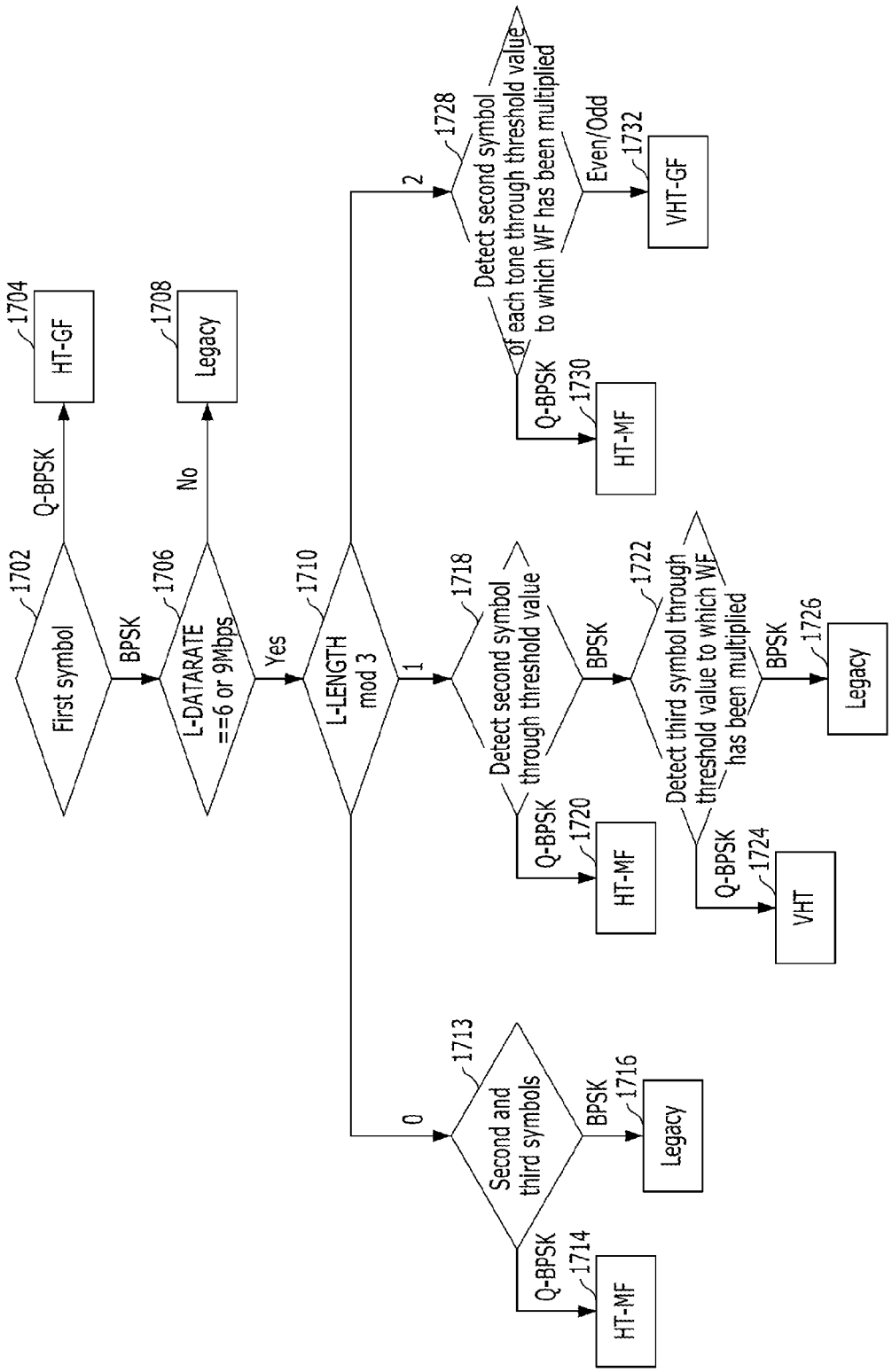
FIG. 17 is a flowchart illustrating a method for enhancing performance of a packet transmission method in accordance with the present invention, by using transmission speed information (L-RATE) and transmission packet length information (L-Length) of a legacy signal field.

At a next step S1710, a threshold value for discriminating the format of the packet is set by using the characteristics of the transport packet length information (L-Length). Since the L-Length has the characteristics that it is set to be an integer multiple of 3 and transmitted, a modular 3 (mod 3) arithmetic result of the L-Length is used. With reference to FIG. 17, when the modular arithmetic result is 0, an automatic detection threshold value for discriminating the legacy mode and the HT-MF mode is set at steps S1713, S1714, and S1716, and when the modular arithmetic result is 1, an automatic detection threshold value for discriminating the legacy mode and the VHT mode is set at steps S1718, S1720, S1722, S1724, and S1726. Also, when the modular arithmetic result is 2, an automatic detection threshold value for discriminating the HT-MF and the VHT-GF is set at steps S1728, S1730, and S1732.

Figure 18:
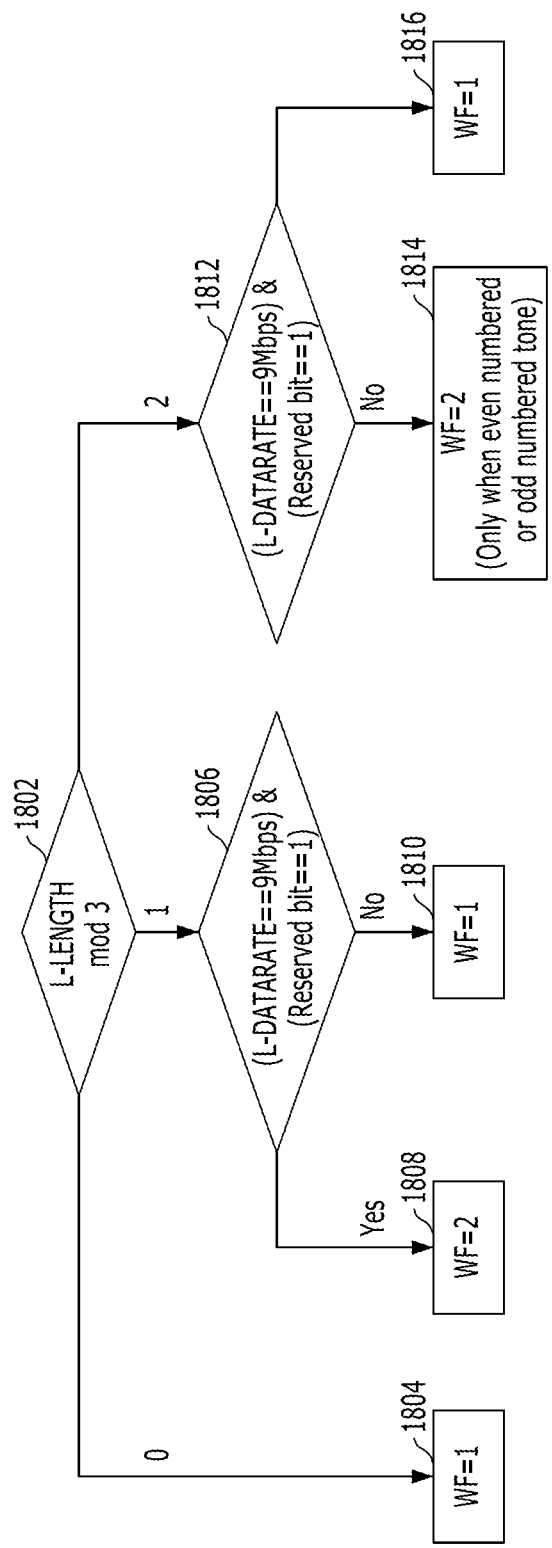
FIG. 18 is a flowchart illustrating the process of obtaining a weighting factor in accordance with an exemplary embodiment of the present invention.

Meanwhile, in the present exemplary embodiment, when I energy and Q energy are compared, a weighting factor (WF) may be multiplied to the Q energy. FIG. 18 is a flowchart illustrating the process of obtaining a weighting factor in accordance with an exemplary embodiment of the present invention. In the embodiment of FIG. 18, the WF has a value of 1 or 2, but it may have a greater value as necessary.

With reference to FIG. 18, when the modular 3 arithmetic result of the L-Length is 0, the discrimination of the existing legacy mode and the HT mode can be fairly evaluated by setting the WF as 1. When the modular 3 arithmetic result of the L-Length is 1, a larger weight may be given to the Q energy by setting the WF as 2. When the modular 3 arithmetic result of the L-Length is 2, the WF is set to be 2 only at the position of the carrier existing at the I axis, so that the energy of the I axis can be detected to be double. In this case, the performance can be further improved compared with the case in which the even numbered carrier and the odd numbered carrier are transmitted by changing their phases. If there is an error in the information of the L-Length, an erroneous result of the automatic detection would be possibly induced. Thus, only when the L-DATA RATE is 9 Mbps and the reserved bit is 1, the weight is reflected, or otherwise, an automatic detection is attempted by setting the WF as 1. In the present exemplary embodiment, both the L-DATA RATE and the reserved bit are used, but in a different exemplary embodiment, only one of the two items of the information may be used. Meanwhile, when the modular 3 arithmetic result of the L-Length is 1 in spite of the use of the L-Length information, it is discriminated whether the second symbol has been modulated through Q-BPSK, to thereby lower the priority of using the L-SIG information having a high error probability compared with the modulation scheme.

As described above, in the present disclosure, the even numbered subcarrier and the odd numbered subcarrier of the second symbol are transmitted by changing their phase 0 degree or 90 degrees. An embodiment of the automatic detection with respect to a packet is as follows. Here, the phases of 0 degree or 90 degrees are merely examples, and the method to be described hereinafter may be applicable to a case in which the even numbered and odd numbered subcarriers are transmitted with phases 45/−45 degrees rather than 0/90 degrees.

Figure 19:
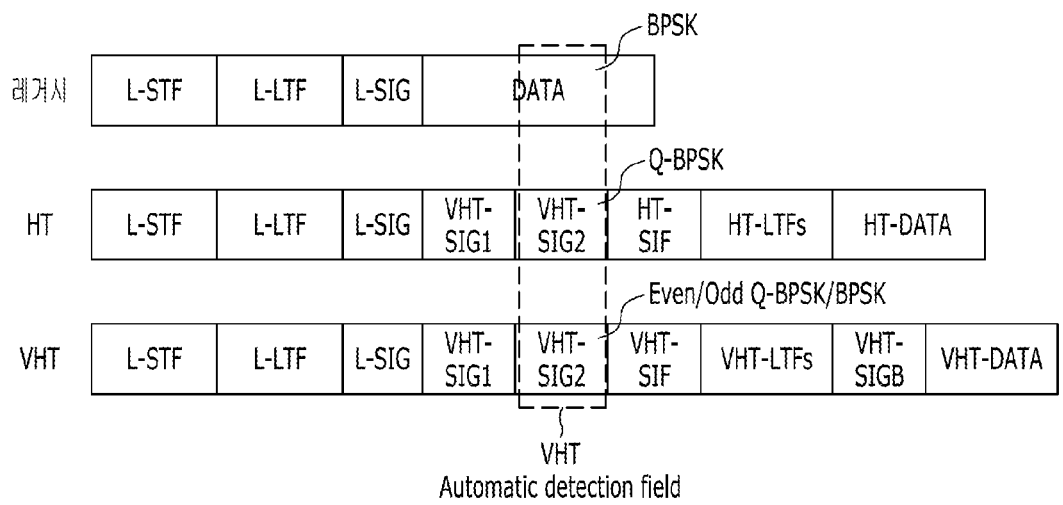
FIG. 19 shows structures of the legacy, HT, and VHT frames employing VHT automatic detection in accordance with an exemplary embodiment of the present invention.

FIG. 19 illustrates structures of the legacy, HT, and VHT frames employing the VHT automatic detection in accordance with an exemplary embodiment of the present invention. In the legacy packet, HT packet, and VHT packet frame formats as illustrated in FIG. 19, the VHT automatic detection may be made by using a VHT-SIGA2. For example, when an odd numbered subcarrier of the VHT-SIGA2 is modulated through 90-degree phase rotated BPSK, namely, Q-BPSK, and the even numbered subcarrier is modulated through BPSK, the reception end may detect the mode of a reception packet in the following manner.

Figure 20:
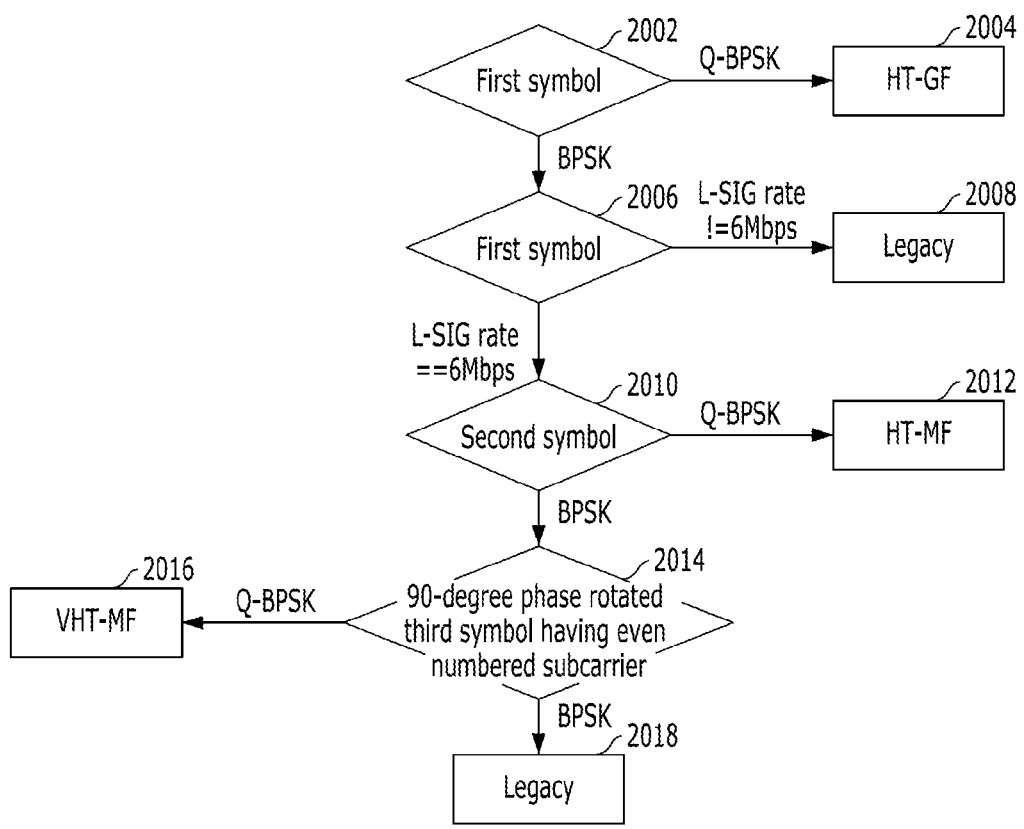
FIG. 20 is a flowchart illustrating a method for detecting the mode of a reception packet in accordance with an exemplary embodiment of the present invention.

FIG. 20 is a flowchart illustrating a method for detecting the mode of a reception packet in accordance with an exemplary embodiment of the present invention. First, a modulation scheme of a first symbol is checked at step S2002. When the first symbol has been modulated through Q-BPSK, a corresponding packet is determined as the HT green field mode (HT-GF) at step S2004. When the first symbol has been modulated through BPSK at step S2006, if the L-SIG Rate is not 6 Mbps, the format of the packet is determined to be legacy at step S2008.

Next, a modulation scheme of a second symbols is checked at step S2010. When the second symbol has been modulated through Q-BPSK, a corresponding packet is determined as the HT mixed mode (HT-MF) at step S2012. When the second symbol has been modulated through BPSK, a modulation scheme of a next symbol is checked at step S2014.

At step S2014, it is determined whether or not the third symbol has been modulated through BPSK or whether each of even numbered or odd numbered carriers has been modulated through BPSK or Q-BPSK by changing their phase. When it is assumed that the even numbered subcarrier of the third symbol has been modulated through BPSK and the odd numbered subcarrier of the third symbol has been modulated through Q-BPSK, whether or not the reception packet is a VHT packet is discriminated as follows:

R=Second symbol after legacy signal field of received packet

R'=Result obtained by rotating phase of even numbered subcarrier by 90 degrees $$D=R+R'$$

In other words, R is a reception signal, R' is the result obtained by rotating the phase by reflecting the pattern of the reception signal, and D is a decision metric as the sum of R and R'. When Q energy of D is greater than I energy, the received packet is determined to be a VHT packet, and when the I energy of D is greater than Q energy, the received packet is determined to be a legacy packet.

The foregoing packet discrimination by using the decision metric will be described in detail as follows. When the format of a received packet is the legacy mode, R is based on BPSK, an even numbered subcarrier of R' is based on Q-BPSK, and an odd numbered subcarrier of R is based on BPSK. Thus, 3/2 energy of D is distributed at BPSK and 1/2 energy is distributed at Q-BPSK.

When the received packet is a VHT packet, an odd numbered subcarrier of the third symbol is based on Q-BPSK and an even numbered subcarrier is based on BPSK. Thus, an odd numbered subcarrier of R is based on Q-BPSK, and an even numbered subcarrier is based on BPSK. Also, since R' is based on Q-BPSK, 3/2 energy of D is distributed at Q-BPSK and 2/1 energy is distributed at BPSK.

According to this principle, I energy and Q energy are always different by 1, and thus, the automatic detection can be made without degrading the performance.

As a result, in accordance with an exemplary embodiment of the present invention, when a packet having an even numbered subcarrier and an odd numbered subcarrier with a 90-degree phase difference is transmitted, the reception end can perform the VHT automatic detection without a degradation of the performance. Even when the third symbol of the VHT packet is modulated through Q-BPSK and transmitted, the limitation which may arise in the 11n device for performing automatic detection can be solved.

A method for discriminating the format of a packet including a green field when the packet is received will now be described.

A green field is used to improve throughput in a wireless LAN. In the 11n standard, reception of the green field is mandatory and transmission of the green field is optional.

Figure 21:
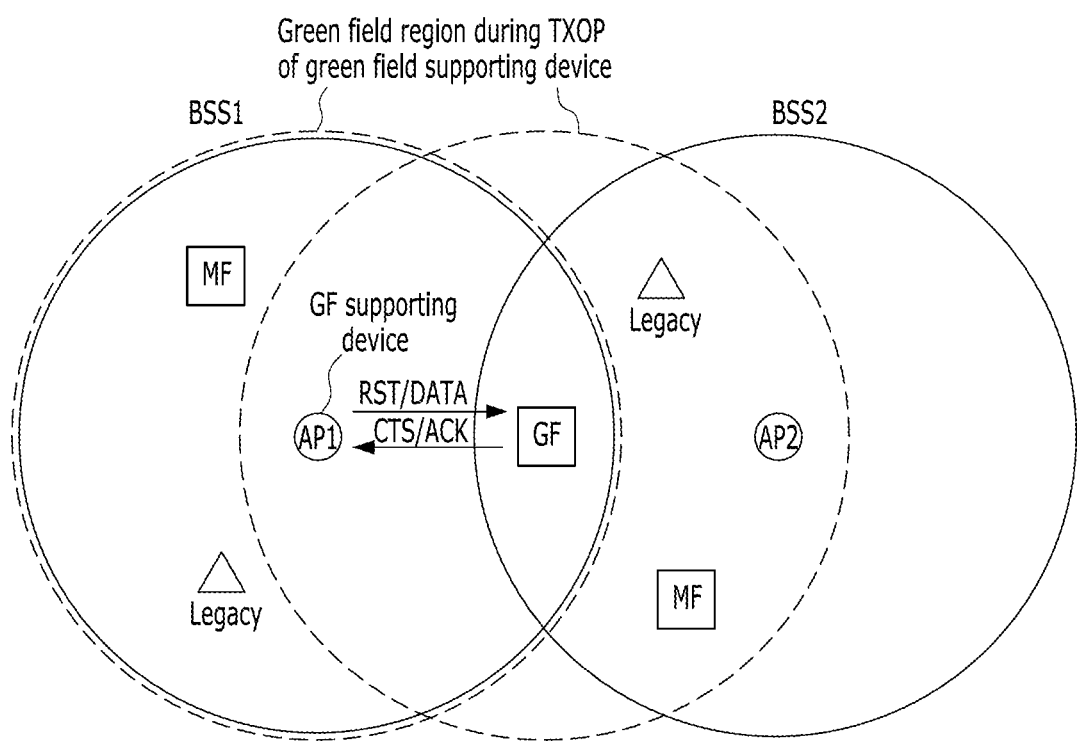
FIG. 21 illustrates the configuration a wireless Local Area Network (LAN) in which a green field is used.

As shown in FIG. 21, the green field is used for the following two cases: 1) When there is no legacy device within a basic service set (BSS), the green field improves throughput (it is used with low frequency), and 2) When there are legacy devices within the BSS, the green field improves throughput between HT devices using RTS/CTS (it is used with high frequency)

Figure 22:
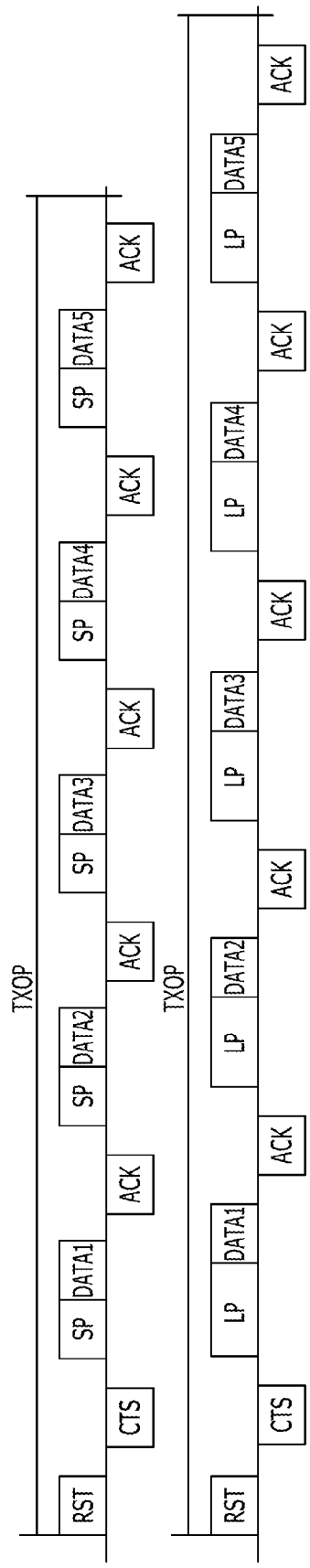
FIG. 22 illustrates the process of transmitting and receiving data between terminals supporting the VHT green field.

FIG. 22 illustrates the process of transmitting and receiving data between terminals supporting the VHT green field. In a packet transmission method in accordance with an exemplary embodiment of the present invention, when two terminals supporting the VHT green field transmit and receive data each other, they can increase throughput by using a packet which includes a set transmission opportunity interval with an RTS and a CTS and uses the VHT green field.

Figure 23:
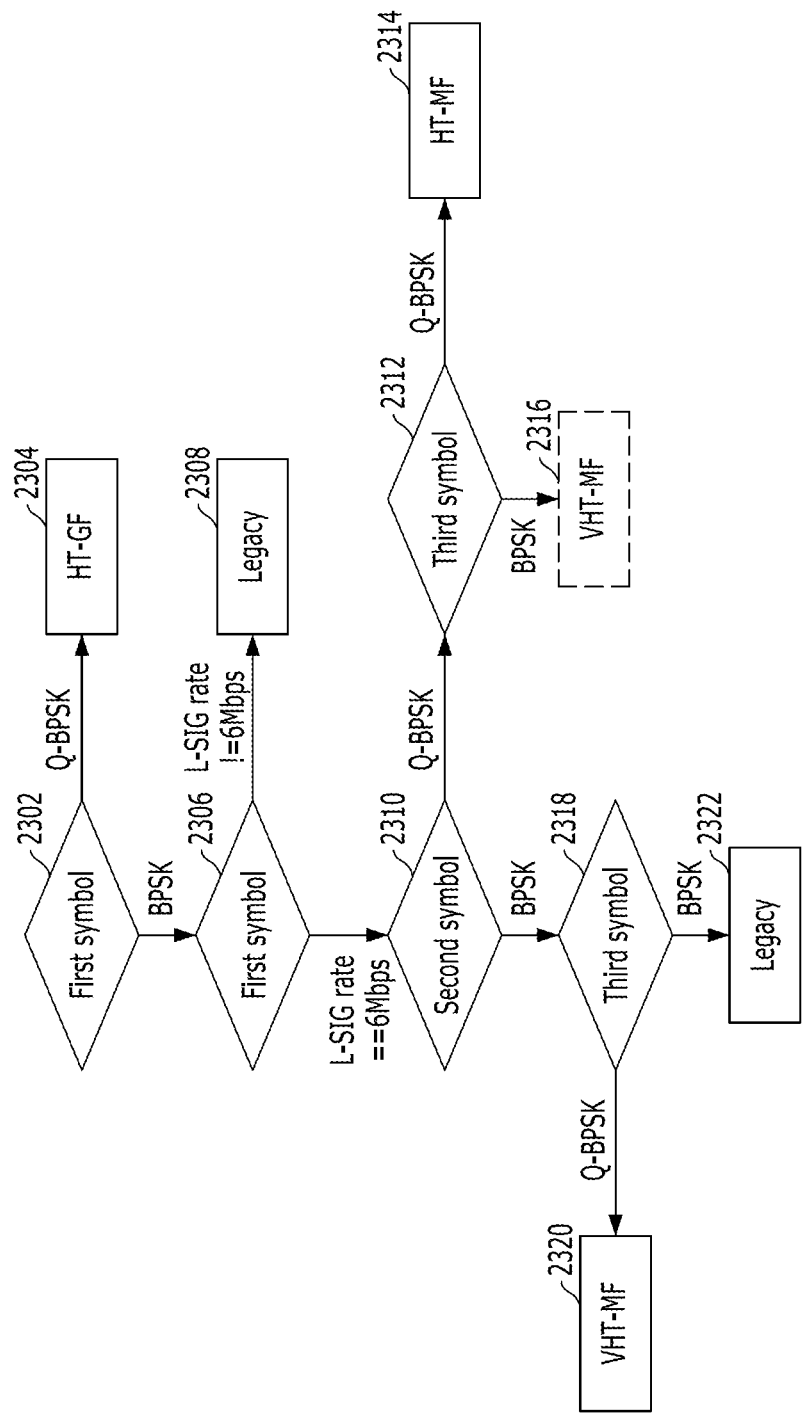
FIG. 23 is a flowchart illustrating a conventional packet discrimination method.

FIG. 23 is a flowchart illustrating a conventional packet discrimination method. When the first symbol of the VHT-SIGA is transmitted through BPSK and the second symbol of the VHT-SIGA is transmitted through Q-BPSK as in the related art, even the third symbol must be buffered at step S2318 as shown in FIG. 23 to discriminate whether or not a corresponding packet includes the VHT green field, increasing the complexity in the implementation. Also, after the 90-degree phase difference is detected at the first symbol at step S2302 and the 90-degree phase difference is detected at the second symbol at step S2310, the 90-degree phase difference must be also detected one more time at the third symbol at step S2318. As a result, since the three continuous 90-degree phase difference detections must be successful, the automatic detection performance is degraded.

Figure 24:
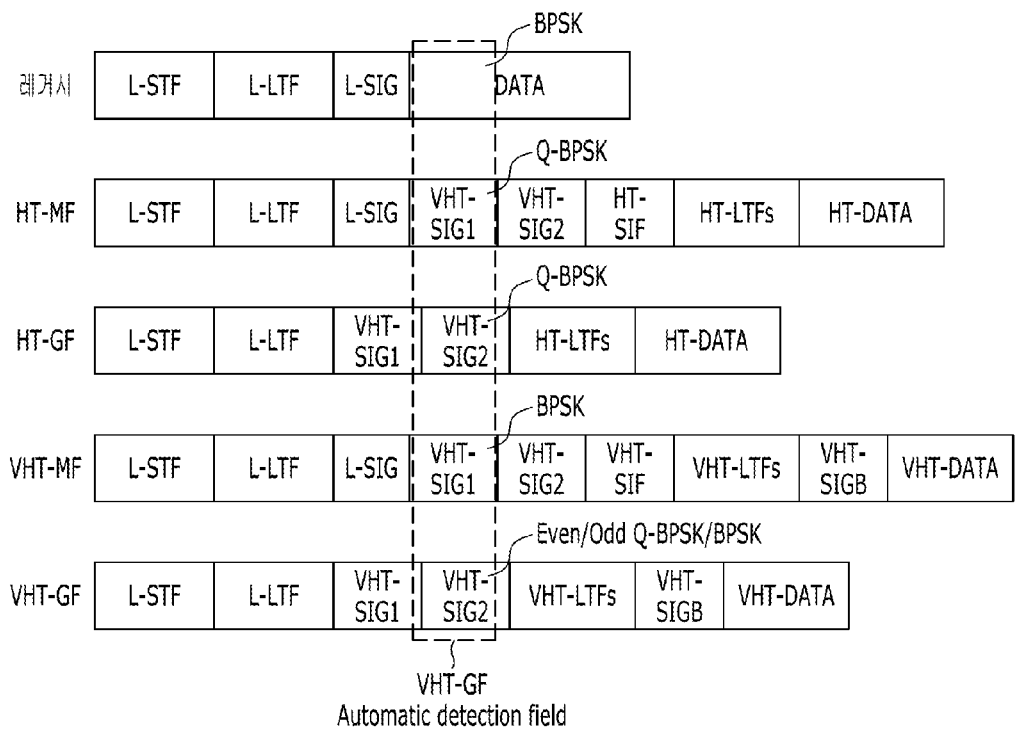
FIG. 24 shows the structures of the legacy, HT-MF, HT-GF, VHT-MF, and VHT-GF frames employing the VHT automatic detection in accordance with an exemplary embodiment of the present invention.

FIG. 24 shows the structures of the legacy, HT-MF, HT-GF, VHT-MF, and VHT-GF frames employing the VHT automatic detection in accordance with an exemplary embodiment of the present invention. When each of the even numbered and odd numbered subcarriers is transmitted by changing their phase by 90 degrees like the VHT-GF in FIG. 24 (e.g., the even numbered subcarrier has a phase of 0 degree and the odd numbered subcarrier has a phase of 90 degrees), whether or not a packet has the VHT green field can be determined in the second symbol.

Figure 25:
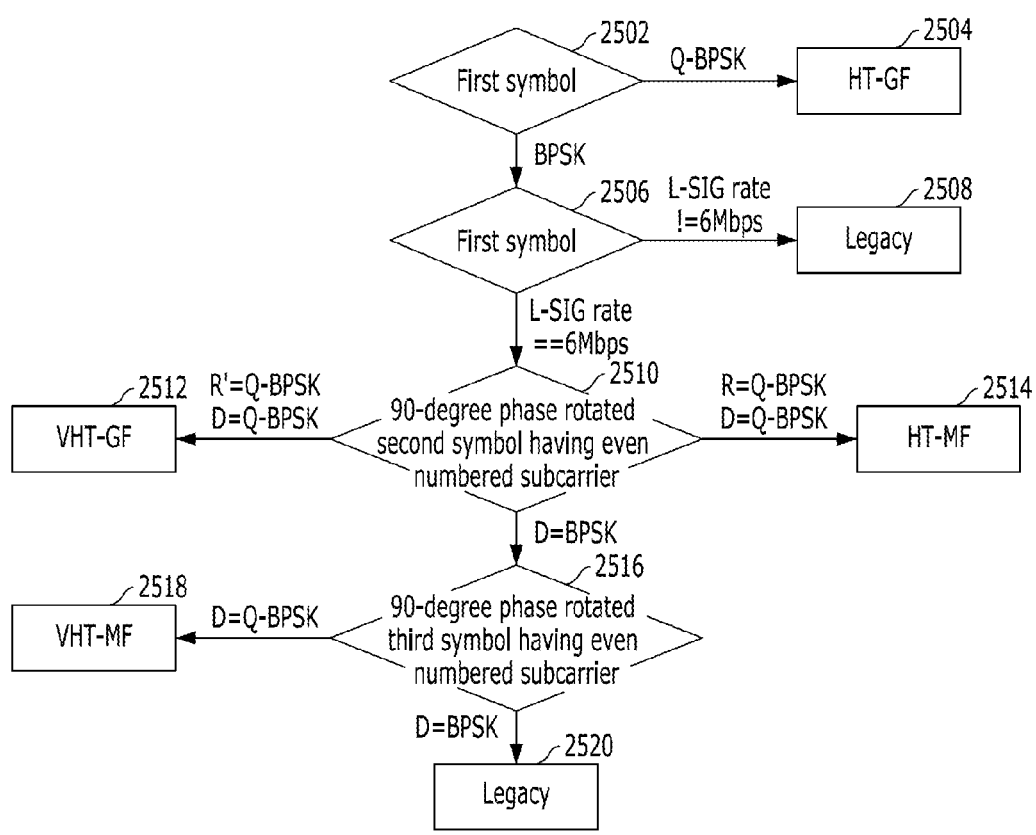
FIG. 25 is a flowchart illustrating a method for detecting the mode of a reception packet in accordance with an exemplary embodiment of the present invention.

FIG. 25 is a flowchart illustrating a method for detecting the mode of a reception packet in accordance with an exemplary embodiment of the present invention. As described above, when the even numbered subcarrier is modulated through BPSK and the odd numbered subcarrier is modulated through Q-BPSK and transmitted, the decision metric is defined as follows:

R=Second symbol after legacy signal field of received packet

R'=result obtained by rotating phase of even numbered subcarrier by 90 degrees.

$$D=R+R'$$

In other words, R is a reception signal, R' is the result obtained by rotating the phase by reflecting the pattern of the reception signal, and D is a decision metric as the sum of R and R'.

In the case of the HT mixed mode (HT-MF) packet, since the second symbol must be modulated through Q-BPSK, the even numbered subcarrier of R' is based on BPSK and the odd numbered subcarrier is based on Q-BPSK. Thus, 3/2 energy of D is distributed at Q-BPSK and 2/1 energy is distributed at BPSK.

In the case of the VHT green field (VHT-GF) packet, the even numbered subcarrier is based on BPSK and the odd numbered subcarrier is based on Q-BPSK. Thus, the even numbered subcarrier of R is based on BPSK, the odd numbered subcarrier of R is based on Q-BPSK, and R' is based on Q-BPSK. Thus, 3/2 energy of D is distributed at Q-BPSK and 2/1 energy is distributed at BPSK.

Namely, in the case of the HT mixed mode and the VHT green field mode, D can be determined by Q-BPSK, R' of the VHT green field mode is based on Q-BPSK, and R of the HT mixed mode is based on Q-BPSK. Thus, whether the corresponding packet is in the HT mixed mode or the VHT green field mode can be discriminated by comparing D, R, and R' at steps S2510, S2512, and S2514.

Meanwhile, when the reception signal is in the VHT mixed mode or in the legacy mode, since D in the second symbol is based on BPSK, D is compared in the third symbol to discriminate whether or not the reception signal is in the VHT mixed mode or the legacy mode at steps S2516, S2518, and S2520.

For reference, the use of the VHT green field mode packet can lead to a reduction in the 8-us or 16-us packet overhead, and in particular, the throughput increases as the transmission opportunity (TXOP) is lengthened, as the packet length is shortened, and as the transfer rate is higher.

Meanwhile, the scheme in which the subcarrier of the second symbol of the VHT signal field is modulated through Q-BPSK and BPSK and transmitted for an automatic detection of a packet can be also implemented as follows: 1) One of the 2 nth carrier and the (2n+1)th subcarrier is modulated through BPSK and the other is modulated through BPSK; 2) One of 3nth, (3n+1)th, and (3n+2)th subcarriers is modulated through BPSK and the others are modulated through Q-BPSK; and 3) One of 4nth, (4n+1)th, (4n+2)th, and (4n+3)th subcarriers is modulated through BPSK and the others are modulated through Q-BPSK.

By adjusting the subcarriers allocated to the Q-BPSK and BPSK as described above, the performance, fairness, and trade-off of stability between the existing WLAN and a newly defined VHT WLAN can be regulated.

In accordance with the exemplary embodiments of the present invention, a new type of frame in use for a wireless communication system supporting a high speed data transmission and reception can be provided.

In addition, in accordance with the exemplary embodiments of the present invention, a method and apparatus for transmitting and receiving data providing compatibility with an existing wireless communication system while supporting the specifications of a new type of wireless communication system can be provided.

While the present invention has been described with respect to the specific embodiments, it will be apparent to those skilled in the art that various changes and modifications may be made without departing from the spirit and scope of the invention as defined in the following claims.

What is claimed is:

1. A method for transmitting, by a transmitting terminal, data to a receiving terminal in a wireless communication system, the method comprising:
   generating a first detection field including symbols modulated by using a BPSK data tone;
   generating a second detection field including symbols, which are modulated such that an even numbered subcarrier and an odd numbered subcarrier have a phase difference of 90 degrees, and modulating the symbols in the second detection field using a pilot tone having a phase difference of 180 degrees;
   generating a data packet including the first detection field, the second detection field, and the data; and
   transmitting the data packet through a band,
   wherein the symbols of the second detection field are modulated such that a data tone of a lower band and a data tone of an upper band have a phase difference of 90 degrees and a pilot tone of the lower band and a pilot tone of the upper band have a phase difference of 90 degrees, when the band is expanded.

2. The method of claim 1, wherein the even numbered subcarrier and the odd numbered subcarrier have phases of 45 degrees and −45 degrees, respectively, or 0 degree and 90 degrees, respectively.

3. A method for receiving, by a receiving terminal, a data packet transmitted by a transmitting terminal in a wireless communication system, the method comprising:
   receiving the data packet including a first detection field, a second detection field, and a legacy signal field through a band; and
   determining a format of the data packet by using the first detection field, the second detection field, and the legacy signal field,
   wherein determining the format of the data packet comprises:
      determining the format of the data packet as a VHT packet format when symbols of the second detection field have been modulated such that an even numbered subcarrier and an odd numbered subcarrier have a phase difference of 90 degrees and modulated using a pilot tone having a phase difference of 180 degrees,
   wherein the symbols of the second detection field have been modulated such that a data tone of a lower band and a data tone of an upper band have a phase difference of 90 degrees and a pilot tone of the lower band and a pilot tone of the upper band have a phase difference of 90 degrees, when the band is expanded.

4. The method of claim 3, wherein determining the format of the data packet comprises:
   determining the format of the data packet as a legacy packet format when transfer rate information of the legacy signal field is not 6 Mbps.

5. The method of claim 4, wherein determining the format of the data packet further comprises:
   determining the format of the data packet as an HT packet format when a symbol of the first detection field has been modulated by using quadrature binary phase shift keying (Q-BPSK).

* * * * *